United States Patent [19]

Hitomi et al.

[11] Patent Number: 5,090,202

[45] Date of Patent: Feb. 25, 1992

[54] INTAKE SYSTEM FOR AN INTERNAL COMBUSTION ENGINE WITH SUPERCHARGER

[75] Inventors: Mitsuo Hitomi; Fumio Hinatase; Toshio Nishikawa; Nobuo Takeuchi, all of Hiroshima, Japan

[73] Assignee: Mazda Motor Corporation, Hiroshima, Japan

[21] Appl. No.: 427,480

[22] Filed: Oct. 27, 1989

[30] Foreign Application Priority Data

Oct. 29, 1988 [JP] Japan .................. 63-274120

[51] Int. Cl.$^5$ .............................................. F02B 37/00
[52] U.S. Cl. ........................... 60/602; 123/52 MB; 123/559.3; 123/564
[58] Field of Search ............... 60/602, 611; 123/564, 123/559.3, 52 M, 52 MB, 52 MV

[56] References Cited

U.S. PATENT DOCUMENTS

| | | | |
|---|---|---|---|
| 4,467,607 | 8/1984 | Rydquist et al. ............... | 60/602 |
| 4,617,897 | 10/1986 | Sasaki et al. | |
| 4,651,684 | 3/1987 | Masuda et al. | |
| 4,829,941 | 5/1989 | Hitomi et al. | |

FOREIGN PATENT DOCUMENTS

| | | | |
|---|---|---|---|
| 41425 | 3/1982 | Japan ............ | 60/602 |
| 59-18226 | 1/1984 | Japan . | |
| 60-75721 | 4/1985 | Japan . | |
| 60-104717 | 6/1985 | Japan . | |
| 61-1836 | 1/1986 | Japan . | |
| 66824 | 4/1986 | Japan ............ | 60/602 |
| 62-49625 | 3/1987 | Japan . | |
| 63-111227 | 5/1988 | Japan . | |
| 63-235624 | 9/1988 | Japan . | |

Primary Examiner—Michael Koczo
Attorney, Agent, or Firm—Fleit, Jacobson, Cohn, Price, Holman & Stern

[57] ABSTRACT

In an internal combustion engine with a supercharger, a timing or timings for varying characteristics of kinetic supercharging effects of intake air are synchronized with a timing or timings for varying supercharging pressures by the supercharger. Reduction in engine torque at the time when the supercharging pressure is shifted, can be compensated for by enhancement in the engine torque generated at the time when the characteristics of the kinetic effect are varied.

14 Claims, 5 Drawing Sheets

INTAKE SYSTEM FOR AN INTERNAL COMBUSTION ENGINE WITH SUPERCHARGER

BACKGROUND OF THE INVENTION

1. Field of the Invention

This invention relates to an intake system for an internal combustion engine having a supercharger.

2. Description of Related Art

In recent years, a number of different considerable types of internal combustion engines have been provided with various types of superchargers to supercharge intake air.

In these types of superchargers, their supercharging pressures to be imposed on the intake air are generally limited in their ability to ehnace the intake air pressure by some limiting factors determined by engine characteristics. Taking the upper limits of the supercharging pressure into consideration in relation to engine speeds, in a low engine speed range, the supercharging pressures are to be limited in order to prevent knocking of the engine. In a middle engine speed range, the supercharging pressures are to be limited to assure the presence of appropriate combustion pressures. In a high engine speed range, the supercharging pressures are to be limited for to ensure the presece of appropriate heat loads thereof. In permissible supercharging pressures thus defined by these limiting factors, the permissible supercharging pressures depending on heat load of the engine are, in general, in the lowest level. Therefore, in conventional engines, the maximum supercharging pressures have been substantially selected on the basis of the permissible supercharging pressure depending on the heat loads of the engines.

In internal combustion engines with superchargers as set forth above, it has been proposed that intake systems of the engines be arranged to supercharge the intake air further with a so-called kinetic supercharging effect of intake air (See, for example, Japanese Utility-Model Laid-Open Publication No.62-49625). The kinetic effect is intended to improve the volumetric efficiency of cylinders of the engine so as to enhance the torque of the engine. Such a kinetic effect includes both an inertia effect of intake air and a resonance effect of intake air .

Since a preferred nature of the kinetic effect is obtained in synchronism with a certain engine speed, to obtain take the kinetic effect in an intake system, it has been proposed to provide a means for allowing the intake system to correspond to different engine speeds, thereby providing the advantageous kinetic effect in a wide range of the engine speeds.

For example, U.S. Pat. No. 4,829,941, issued on May 16, 1989 to the same assignee as the present application, discloses one type of intake system having means for changing over the length of the resonance air column in the intake system on the basis of the engine speeds to obtain an advantageous intake air resonance effect over a wide range of engine speeds. Further, the U.S. Pat. No. 4,617,897, issued on Oct. 21, 1986 to the same assignee as the present application, discloses another type of intake system which is adapted to change the length and the cross-sectional area of the intake passage to obtain a preferred intake air inertia effect over a wide range of engine speeds. Furthermore, U.S. Pat. No. 4,651,684 issued on May 24, 1987 to the same assignee as the present application, discloses still another type of intake system in which the valve timing of the intake valve is changed, so as to vary the opening time thereof according to the operating condition of the engine, so that the volumetric efficiency is improved.

In the conventional engines with superchargers such as those previously mentioned, since the maximum value of the supercharging pressure provided by the supercharger is determined on the basis of a limiting factor which depends on the heat load of the engine, the engine can afford to enhance the supercharging pressures in low and middle engine speed ranges. Therefore, it is taken into consideration that the maximum supercharging pressure is shifted in accordance with a parameter defined by engine speeds. In other words, when, in simplification, the engine speed range is supposed to be divided into a relatively low range and a relatively high range, the maximum supercharging pressure is set to a high value in the low engine speed range and the maximum supercharging pressure is set to a low value in the high engine speed range, thereby changing the maximum supercharging pressure over between low and high values in accordance with the engine speeds.

However, in such an arrangement, at the time the maximum supercharging pressure is shifted, there is generated a great fluctuation in engine torque, that is, a torque shock, and, therefore, consideration of this problem has been required.

SUMMARY OF THE INVENTION

Accordingly, it is an object of the present invention to provide an internal combustion engine with a supercharger which avoids the generation of torque shock at the time when the maximum supercharging pressure of the supercharger is shifted.

In accordance with the present invention, there is provided:

an intake system for an internal combustion engine with a supercharger including:

passage means for introducing intake air into each of the cylinders of the engine, having first intake passages each of which is individually connected with each of the cylinders and a second intake passage which is in communication with the first intake passages;

supercharging means having a compressor which is disposed in the second intake passage for supercharging the intake air;

control means for varying supercharging pressure provided by the supercharger according to operating conditions of the engine;

varying means for changing characteristics of the kinetic effect of the intake air so that a desired kinetic effect can be obtained in accordance with the operating conditions; and synchronizing means for synchronizing a timing or timings for varying the characteristics of the kinetic effect by the varying means with a timing or timings for varying supercharging pressure by the control means.

In accordance with the present invention, a reduction in torque generated at the time when the supercharging pressure is shifted, can be compensated for by enhancement of the torque generated at the time when characteristics of kinetic effect of intake air vary. Thus, in an internal combustion engine with supercharger, an improved intake system which accommodates advantageously to both the functions of the supercharger and the kinetic effect of intake air can be obtained. In other words, the torque curve of the engine can be improved as a whole so that it is a smooth torque curve and great fluctuation of the torque, namely, torque shock upon the shift of the supercharging pressure is not generated.

DESCRIPTION OF THE DRAWINGS

These and other objects and features of the invention will be more understood with reference to the following detailed description of illustrative embodiments of the invention, taken in connection with the accompanying drawings, in which.

DESCRIPTION OF THE PREFERRED EMBODIMENT

Figure 1:
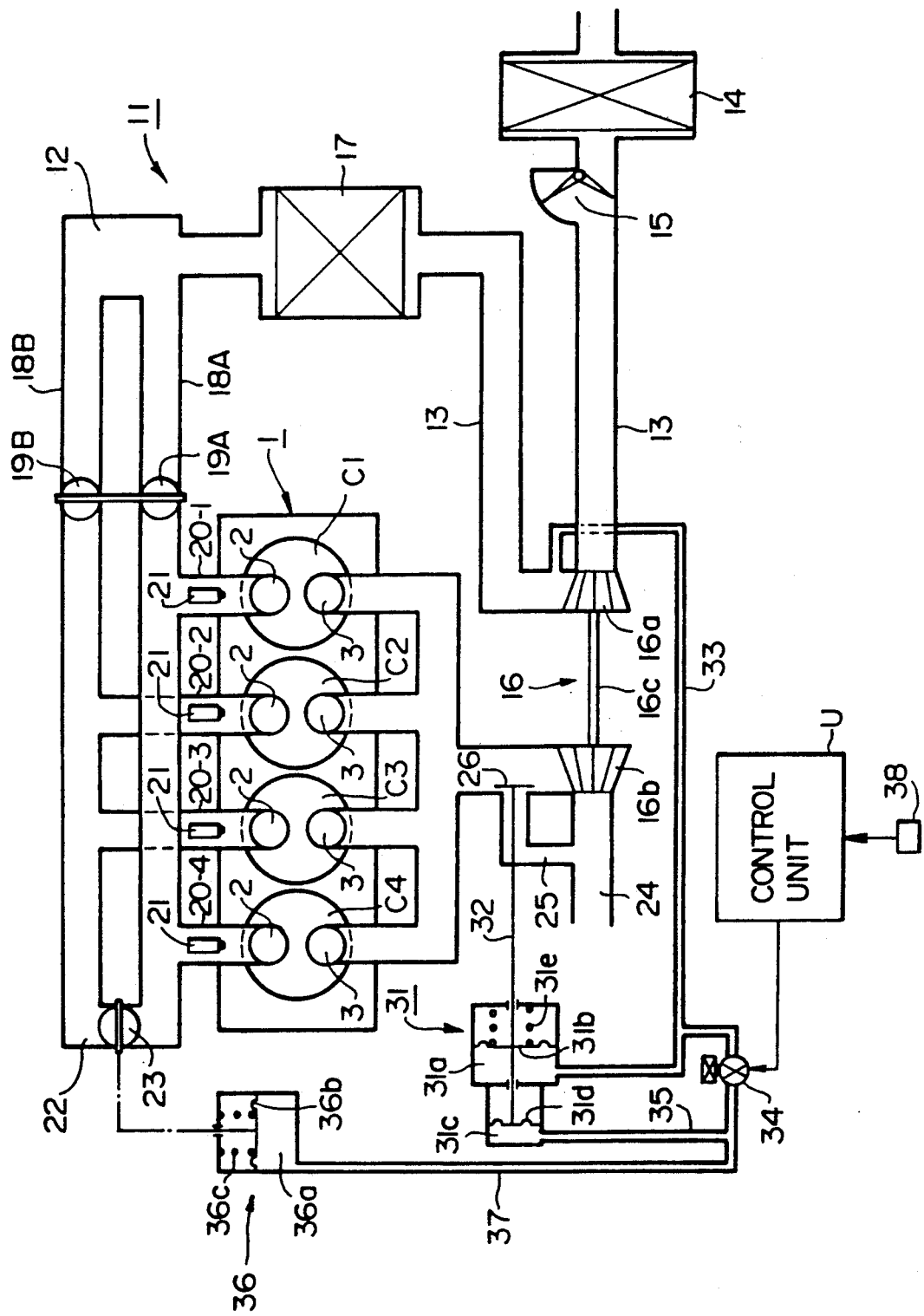
FIG. 1 is a schematic plan view illustrating diagramatically an internal combustion engine provided with an intake system in accordance with an embodiment of the present invention.

Referring to FIG. 1, an Otto-cycle four-cylinder engine 1 is shown therein, each of the cylinders C1–C4 of the engine 1 being provided with an intake port 2 and exhaust port 3. The intake ports 2 and the exhaust ports 3 are opened or closed in timed relations in synchronism with rotation of a crankshaft (not shown) of the engine by intake valves and exhaust valves (not shown), as is well-known in the art.

An intake passage 11 for introducing intake air into the cylinders C1–C4 has in its way a surge tank 12, which functions as a first pressure reflecting portion. The surge tank 12 is adapted to be supplied with the intake air through one common intake passage 13, which is provided with an air cleaner 14, an air-flow meter 15, a compressor 16a of a turbo-type supercharger (referred to hereinafter as a "turbo-charger"), and an inter cooler 17, one after another from an upstream side.

The intake passage 11 is divided into two branch intake passages 18A and 18B on its downstream side of the surge tank 12, and the branch intake passages 18A, 18B are provided with throttle valves 19A, 19B, respectively, which operate in an interlocked relation with each other. On a downstream side of the throttle valve 19A, the branch intake passage 18A individually communicates through discrete intake passages 20-1, 20-4 with each of the intake ports 2 of the first and fourth cylinders C1, C4, which do not fire successively. Further, on a downstream side of the throttle valve 19B, the branch intake passage 18B individually communicates through discrete intake passages 20-2, 20-3 with each of the intake ports 2 of the second and third cylinders C2, C3, which do not fire successively. Each of the discrete intake passages 201 1∼20∼4 is provided with a fuel injection valve 21.

Figure 2:
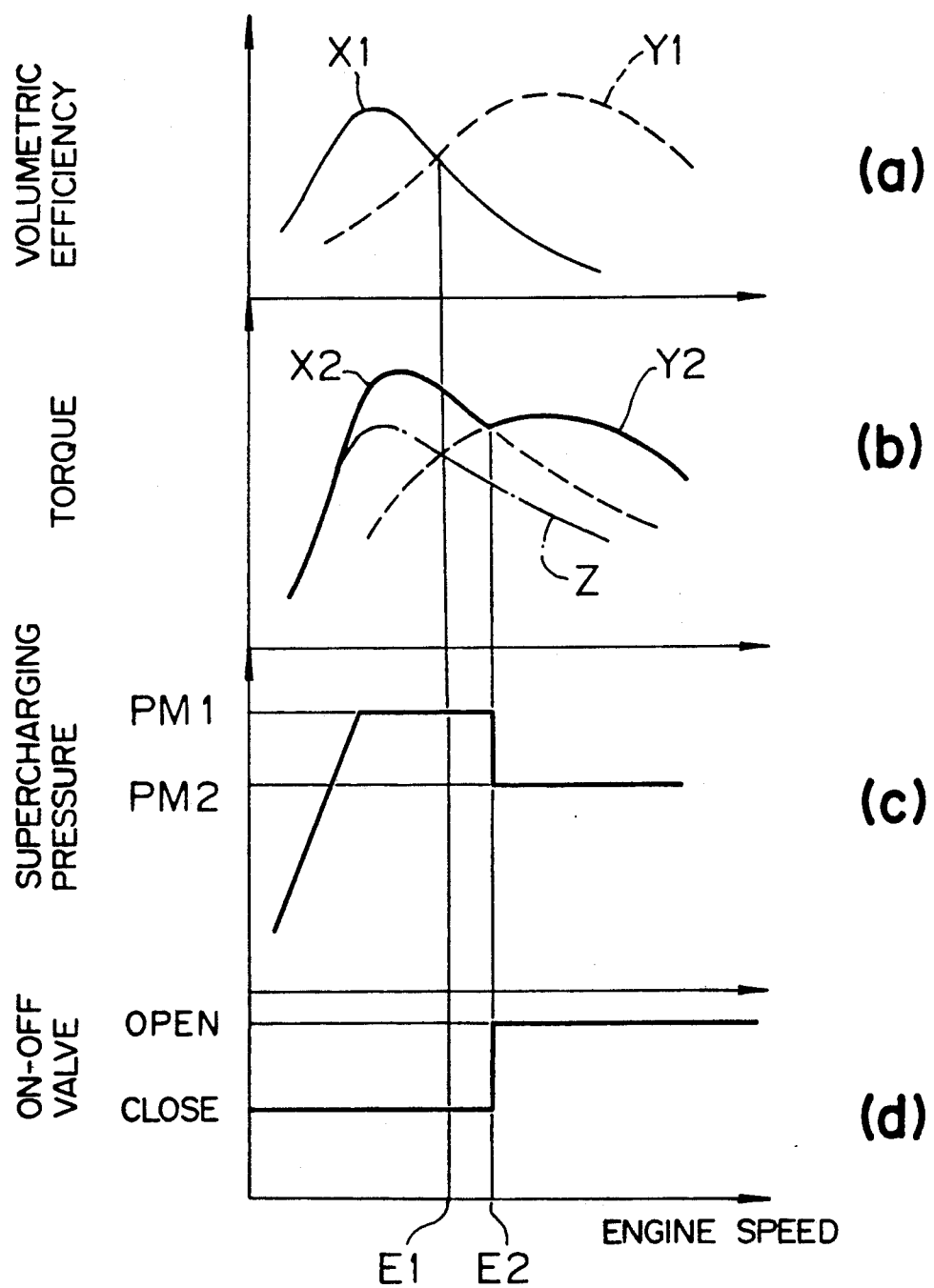
FIG. 2 is a graphical representation showing the characteristics in operation of the engine shown in FIG. 1.

The branch intake passages 18A and 18B can be, on their end portions opposite to the surge tank 12, in communication with each other through a communicating passage 22 which functions as a second pressure reflecting portion. The communicating passage 22 is provided with an on-off valve 23 which can open and close the communicating passage 22. The distance between each of the intake ports 2 and the surge tank 12 (the first pressure reflecting portion) taken along the discrete passage and the branch passage, is set to be larger than the distance between each of the intake ports 2 and the communicating passage 22 (the second pressure reflecting portion) taken along the discrete and branch passages. Therefore, when the on-off valve 23 is closed, the surge tank 12 comes to act as the pressure reflecting portion and the resonance air column is set to a relatively long length, so that the length of the resonance air column can correspond to a relatively low engine speed range for obtaining the proper kinetic effect of intake air therein. On the other hand, when the on-off valve 23 is opened, the communicating portion comes to act as the pressure reflecting portion and the resonance air column is set to a relatively short length, so that the length of the resonance air column can correspond to relatively high engine speed range for obtaining the proper kinetic effect of intake air therein. Variations in the volumetic efficiency involved in such opening and closing of the on-off valve 23 are shown in FIG. 2(a), in which the curve X1 represents the variation in a state where the on-off valve 23 is closed and the curve Y1 indicates the variation in a state where the on-off valve 23 is opened.

Further, an exhaust passage 24 in communication with the exhaust ports 3 is joined into a single passage, and on the downstream side of the joined portion, a turbine 16b of the turbo-charger 16 is located. The turbine 16b is connected to the compressor 16a by means of a shaft 16c, so that the rotation of the turbine 16b by the energy of the exhaust gas allows the compressor 16a to rotate to effect asupercharging of the intake air. Still further, the exhaust passage 24 is provided with a bypass passage 25 for bypassing the turbine 16b, in which a waste gate valve 26 is disposed for defining the maximum pressure of the supercharged intake air.

The pressure for opening the waste gate valve 26 is adjusted by an actuator 31 reciprocating in responses to fluid-pressure. The actuator 31 has a first diaphragm 31b which defines a first chamber 31a and a second diaphragm 31d which defines a second rhamber 31c, and the first and second diaphragms 31b, 31d are connected to the waste gate valve 26 by means of a shaft 32. The waste gate valve 26 is normally energized by a return spring 31e so as to close the by-pass passage 25.

The first chamber 31a normally communicates by way of a signal line 33 with the common intake passage 13 on the downstream side of the ccmpressor 16a. The second chamber 31c is connected to the signal line 33 by way of a signal line 35 and a solenoid operated three way control valve 34 connected with the signal line 35. The control valve 34 has a first position in which the signal line 35 communicates with the signal line 33, and a second position in which the signal line 5 is released to the atmosphere. Therefore, when the control valve 34 takes the second position, the second chamber 31c is released to the atmosphere and the supercharging pressure provided by the turbo-charger 16 acts on only the first chamber 31a, so that the waste gate valve 26 is to be opened when the supercharging pressure reaches the first maximum supercharging pressure PM1 which is determined to be a relatively high value. On the other hand, when the control valve 34 takes its first position, the supercharging pressure provided by the turbocharger 16 acts on both the first and second chambers 31a, 31c (so that the waste gate valve 26 is to be opened when the supercharging pressure. reaches the second maximum pressure PM2 which is determined to be a relatively low value. These different maximum pressures PM1 and PM2 are indicated in FIG. 2(c).

Further, the on-off valve 23 is opened and closed by an actuator 36 reciprocating in response to fluid-pressure. The actuator 36 has a diaphragm 36b which defines a chamber 36a, and the diaphragm 36b is connected to the on-off valve 23. The chamber 36a is in communication with a signal line 37 which branches from the signal line 35 downstream of the control valve 34. Therefore, when the control valve takes the second position, the chamber 36a is released to the atmosphere so that the on-off valve 23 is closed. On the other hand, when the control valve 34 resides in the first position, the super-charging pressure acts on the chamber 36a so that the on-off valve 23 is opened. Thus, the on-off valve 23 is operated corresponding to a shift of the maximum supercharging pressure to vary the length of the resonance air column for obtaining desired of intake air kinetic effect, and the engine speed at which the maximum pressure is shifted, and at which the on-off valve is operated, is indicated by a line E2 in FIG. 2.

In order to change over the positions of the control valve 34 on the basis of the engine speeds, there is provided a control unit U, and an engine speed signal is introduced into the control unit U from an engine speed sensor 38. The control unit U operates the control valve 34 in such a manner as above described when the engine speed reaches the value E2.

In FIG. 2b, torque curves of the engine are shown, which are provided by the aforementioned position control of the control valve 34. The curve X2 of the torque curves represents the engine torque in the case where the maximum supercharging pressure is set to PM1 and the resonance air column is set to a relatively long length, and the curve Y2 of the torque curves represents the engine torque in the case where the maximum supercharging pressure is set to PM2 and the resonance air column is set to a relatively short length. The engine speed E2 is to be selected so as to correspond to the intersection of the curve X2 and the curve Y2, and the value of E2, in conventional type of engines is generally seleced to, be for example, 2500 rpm~3000 rpm. Further, the torque curve Z represented in FIG. 2(b) by a phantom line indicates the engine torque in a case where the maximum supercharging pressure would be constantly set to PM2 and the resonance air column would be set to a relatively long length an overall engine speed range. Still further, the engine speed E1 shown in FIG. 2(d) indicates an engine speed selected in a conventional manner such that the length of the resonance air column is changed over at the engine speed for obtaining the appropriate kinetic effect of intake air with the maximum supercharging pressure kept at a constant value.

Figure 3:
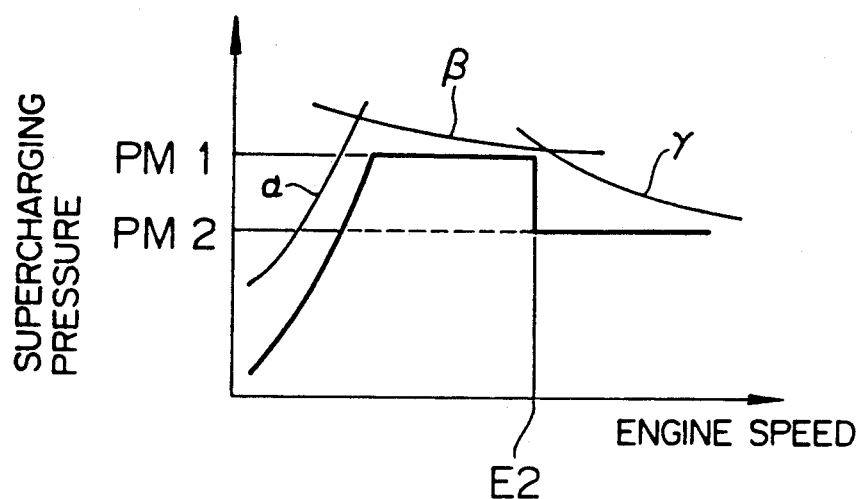
FIG. 3 is a graphical representation showing relationships among the limiting factors, maximum supercharging pressures and engine speeds for shifting the maximum supercharging pressure.

In FIG. 3, there is shown how the aforementioned engine speed E2 and maximum supercharging pressure PM1, PM2 is selected in relation to limiting factors of the supercharging pressure for ensuring an appropriate operation of the engine. In FIG. 3, a line $\alpha$ indicates a limiting line for preventing knocking of the engine, a line $\beta 0$ indicates a limiting line for maintaining appropriate combustion pressure, and a line $\gamma$ indicates a limiting line for ensuring appropriate heat load.

It will be understood from the description as set forth above that, according to the present invention, when the maximum supercharging pressure is shifted in accordance with the engine speed ranges of the engine, the torque shock at the time of shifting the pressure can be prevented. Further, since the supercharging pressure can be enhanced in a relatively low engine speed range, the advantageous torque in an Otto-cycle engine can be ensured during operation of the engine in the low engine speed range. Further in a diesel engine, the response thereof can be advantageously ensured particularly during quick accelerating.

Figure 4:
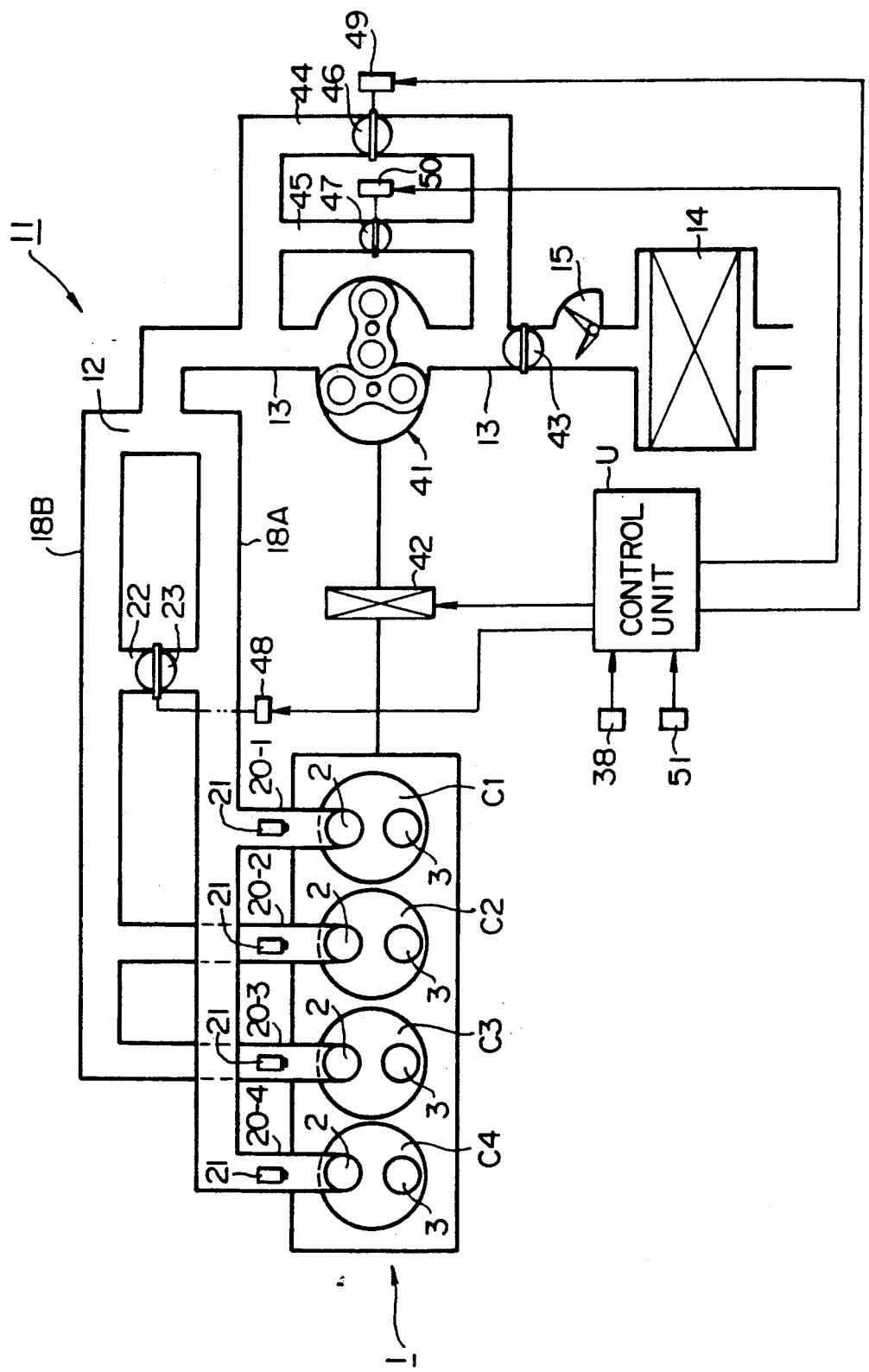
FIG. 4 is a schematic plan view illustrating diagrammatically an internal combustion engine provided with an intake system in accordance with another embodiment of the present invention.

FIG. 4 shows another embodiment according to the present invention, in which the members or mechanisms equal to the ones shown in FIG. 1 are designated by the same reference numerals as used in FIG. 1.

In the present embodiment, there is provided a so-called mechanical-type supercharger which is mechanically driven by a crankshaft the engine. That is, a Roots-type supercharger 41 is disposed in a common intake passage 13, and the supercharger 41 is connected to the crankshaft of engine 1 by means of an electromagnetic clutch 42. A throttle valve 43 is disposed on the upstream side of the supercharger 41 in the common intake passage 13. On the downstream side of the throttle valve 43, the common intake passage 13 has a by pass passage 44 and a relief passage 45 arranged in parallel so as to be able to bypass the supercharger 41. The by pass passage 44 is provided with an on-off valve 46, and the relief passage 45 is provided with an on-off valve 47. The on-off valve 46 and 47 and an on-off valve 23 disposed in a communicating passage portion 22 are adapted to be opened or closed by electromagnetic actuators 49, 50 and 48, respectively. Further, there is provided a control unit U, into which a signal from a supercharging pressure sensor 51 for sensing supercharging pressure and a signal from an engine speed sensor 38 are inputted.

In the engine 1 having the arrangement as above described, when the engine speeds is lower than a predetermined speed, that is, when the engine speed reside in a range in which driving resistance of the supercharger is not greatly increased, the clutch 42 is operatively connected to drive the supercharger 41. Simultaneously, the on-off valve 23 as well as the on-off valve 46 are kept in their closed position so that a surge tank 12 defines a pressure reflecting portion to form a relatively long resonance air column.

On the other hand, when the engine speed is increased to a lever higher than the predetermined speed, the clutch 42 is released to disengage from the supercharger 41 so that supercharger 41 is not driven, and the on-off valve 23 is opened. This allows the maximum supercharging pressure to shift to a level (actually, supercharging effect by the supercharger 41 is not provided) and the resonance air column to change to a short length. Further, as easily understood, while the supercharger 41 is not operated, the on-off valve 46 is forced to be opened.

As set forth above, since the length of the resonance air column, in order to obtain an advantageous kinetic effect of intake air, is changed over in synchronism with the switching of the supercharger 41 between an operating state and a nonoperating state, the torque shock generated in the engine 1 upon the switching therebetween can be prevented, similar to the aforementioned embodiment shown in FIG. 1.

In addition, the on-off valve 47 located in the relief passage 45 is opened in a case in which the supercharging pressure is extraordinarily increased for any reason during operation of the supercharger 41. Alternatively, the on-off valve 47 may be used to shift the supercharging pressure during operation of the supercharger 41 as in the aforementioned embodiment shown in FIG. 1, wherein the on-off valve 23 is operated to open or close synchronously with the shift of the supercharging pressure by the on-off valve 47.

Figure 5:
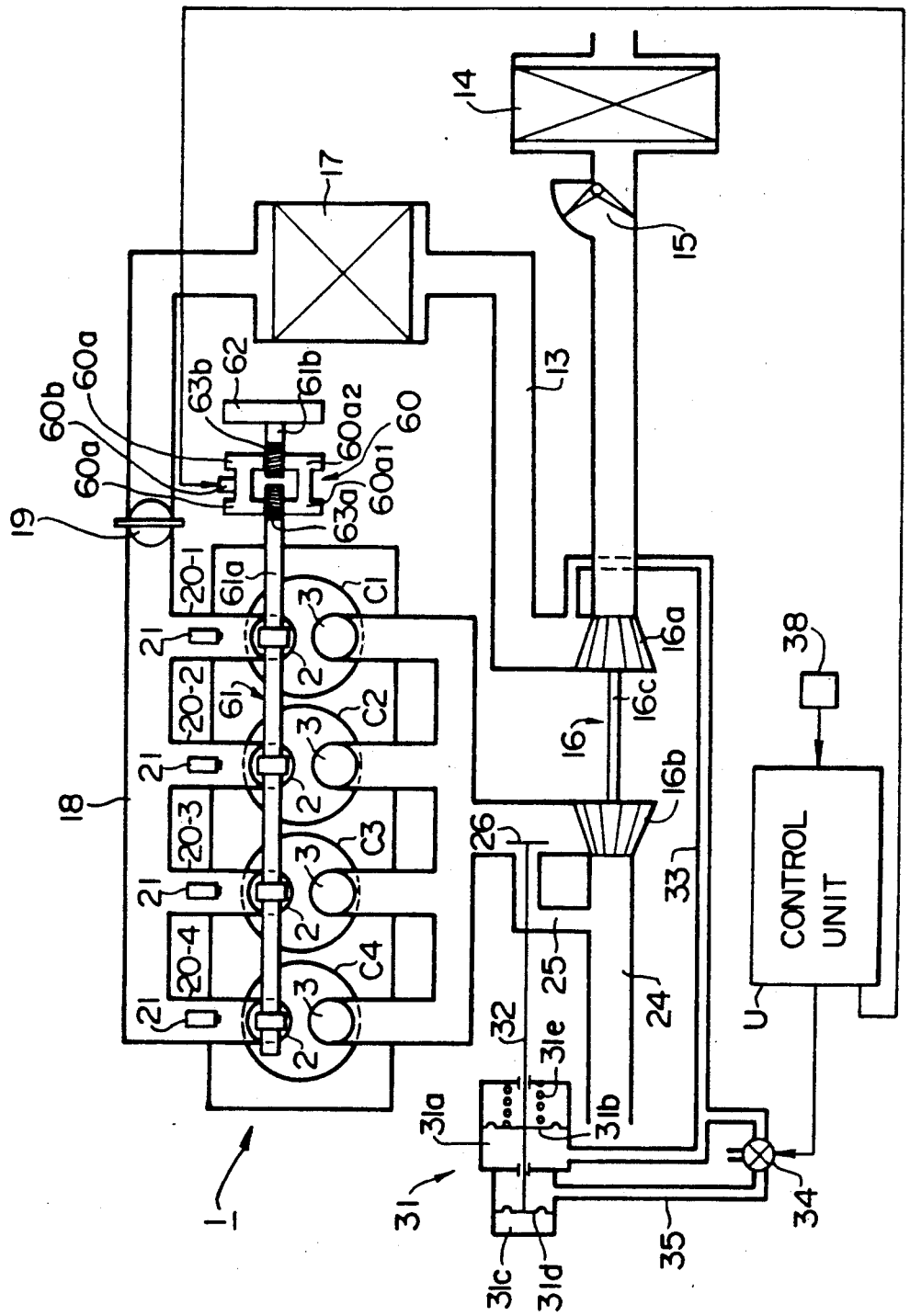
FIG. 5 is a schematic plan view illustrating diagramatically an internal combustion engine provided with an intake system in accordance with still another embodiment of the present invention.

FIG. 5 shows still another embodiment in accordance with the present invention, in which the members or mechanisms corresponding to the ones shown in FIG. 1 are designated by the same reference numerals as used therein.

In an internal combustion engine 1 according to the present embodiment, there is provided a valve timing control mechanism 60, which comprises a cam shaft assembly 61 for driving intake valves (not shown) to open and close intake ports 2, a sleeve 60a, generally H shaped in section and incorporated into the cam shaft assembly 61, and a shift lever 60b adapted to be controlled by a contr..ol unit U. The cam shaft assembly 61 is divided into two portions 61a and 61b, with one being a cam shaft associated with cams for driving intake valves, the other being a portion connected with a pulley 62 which is driven in rotation by a crankshaft (not shown) by means of a timing belt (not shown). The portions 61a, 61b are respectively formed at their opposite end portion with helical splines 63a, 63b, which are oriented in opposite directions, and internal peripheral portions of two flanges $60a_1$ and $60a_2$ of the sleeve 60a respectively engage with the helical splines 63a,63b. The control unit U inputs control signals into the shift lever 60b.

Figure 6:
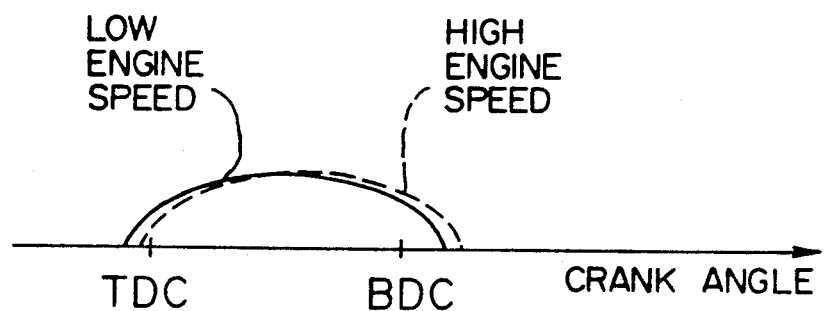
FIG. 6 is a graphical representation showing a change in the valve timing of the engine shown in FIG. 5 in relation to the crank angles.

When the engine 1 has such an arrangement, a relative phase angle between the portions 61a and 61b of the cam shaft assembly 61, that is, a relative phase angle between the cam shaft and the crankshaft (not shown), is controlled by the sleeve 60 so that the intake valves are opened and closed in accordance with valve timing shown by a solid line in FIG. 6 when the engine speed is in a low speed range less than a predetermined engine speed. Thus, the intake valves are closed at a relatively early timing in the low engine speed range. Therefore, the charging efficiency is enhanced in the low engine speed range and thus, the torque of the engine varies substantially along a predetermined torgue curve such a the torque curve X2 shown in FIG. 2(b).

As the control unit U senses, on the basis of the signals inputted from an engine speed sensor 38, that the engine speed has increased up to the predetermined engine speed, the control unit U outputs a control signal to the shift lever 60b and permits the shift lever 60b to move the sleeve 60 axially. Since the helical splines 63a and 63b are oriented in opposite directions, flanges $60a_1$ and $60a_2$ of the sleeve 60 allow the portions 61a and 61b of the cam shaft assembly 61 engaging therewith to rotate in opposite directions relative to each other, so that the relative phase angle between the portions 61a and 61b, namely between the cam shaft and the crankshaft is changed. Thereby, the timing for closing the intake valve is retarded as shown by a dotted line of FIG. 6. Therefore, the charging efficiency is enhanced in the high engine speed range, and the engine torque varies substantially along a desired torque curve such like the torque curve Y2 shown in FIG. 2(b).

At the time when the valve timing is displaced so as to retard the timing for closing the intake valve, the control unit U permits a three way control valve 34 to operate an actuator 31 to shift the maximum permissible supercharging pressure a relatively low pressure.

As can be understood from the aforementioned matters, in the present embodiment, since the valve timing control mechanism 60 displaces the valve timing for closing the intake valve to change the condition of intake air and at the same time, the control valve 34 allows the waste gate valve 26 to shift the maximum supercharging pressure, high charging efficiency of intake air can be ensured over a wide range of engine speeds, and knocking of the engine can be prevented.

Further, although in this embodiment, the relative phase angle between the cam shaft and the crankshaft is changed, and thereby the valve timing is displaced to change the valve timing for closing the intake valve, the lifting stroke may be changed to increase or decrease a period of opening time of the intake valve so as to change only the valve closing timing.

Still further, in the embodiments as set forth above, the maximum supercharging pressure is set to two different pressures, and the maximum pressure is stepwisely changed to either of them. However the maximum pressure may be set to three or more than three different pressures, which can respectively, apply properly to the limiting lines shown in Fugure 3, and further, the length of resonance air column for obtaining the resonance effect may be changed over to three or more than three lengths.

Also, the manner for controlling the maximum supercharging pressure has been described as a manner wherein the waste gate valve adjusts the exhaust air flow introduced into the turbine of turbine-type supercharger, and another manner wherein the connecting condition between the crank shaft of the engine and the compressor of the mechanical-type supercharger is changed (engaged or disengaged). However, other various manners for control of the supercharging pressure known in the art, for example, a manner wherein the relief passage relieves the supercharging pressure provided by the compressor of the mechanical-type supercharger, can be adaptd in accordance with the present invention.

While the embodiments of the present invention, as herein disclosed, constitute preferred forms, it is to be understood that other forms might be adopted.

We claim:

1. An intake system for an internal combustion engine with a supercharger, comprising:
   intake passage means for introducing intake air into each of a plurality of cylinders of said engine, said passage means having first intake passages, each of which is individually conencted with one of said cylinders, and a second intake passage which is in communication with said first intake passages;
   supercharging means having a compressor which is disposed in said second intake passage for supercharging the intake air, said supercharging means providing a kinetic supercharging effect to the intake air in said passage means;
   first control means for varying supercharging pressure according to operating conditions of said engine;

second control means for varying said kinetic supercharging effect so that volumetric efficiency is changed in accordance with the operating conditions of said engine; and synchronizing means for synchronizing said first control means and said second control means so that the supercharging pressure is varied by said first control means at a time when the volumetric efficiency is changed by the second control means.

2. An intake system for an internal combustion engine with a supercharger as defined in claim 1, wherein said first control means varies a maximum permissible supercharging pressure on the basis of engine speeds of said engine.

3. An intake system for an internal combustion engine with a supercharger as defined in claim 2, wherein said first control means controls the maximum permissible supercharging pressure of intake air so that when engine speeds are in a relatively high engine speed range, over a predetermined engine speed, the maximum permissible supercharging pressure is set to a lower pressure than the maximum permissible supercharging pressure which is set when he engine speeds are in a relatively low engine speed range, less than the predetermined engine speed.

4. An intake system for an internal combustion engine with a supercharger as defined in claim 3, wherein said supercharging means is a turbo-type supercharger having a turbine which is disposed in exhaust passage means of said engine, said turbine driving said compressor to rotate together with rotation of sid turbine, said supercharging means including bypass passage means for bypassing exhaust gas air introduced into said turbine, and a waste gate valve emans for adjusting a cross-sectional area of said bypass passage means.

5. An intake system for an internal combustion engine with a supercharger as defined in claim 4, wherein said waste gate valve means includes a valve body and diaphragm means for displacing said valve body, said diaphragm means being associated with a chamber, fluid pressure ins aid chamber allowing said diaphragm means to displace said valve body so that said wastegate valve means adjusts the cross-sectional area, sot hat the maximum permissible supercharging pressure is set to one of a first pressure and a second pressures.

6. An intake system for an internal combustion engine with a supercharger as defined in claim 1, wherein said supercharging means comprises a mechanical-type supercharger which is arranged to drive a compressor to rotate together with rotation of a crankshaft of said engine.

7. An intake system for an internal combustion engine with a supercharger as defined in claim 6, wherein said supercharging means further comprises clutch means for bringing said compressor into operative engagement with and disengagement from said crankshaft, and clutch control means for controlling said clutch means, said clutch control means causing said clutch means to engage said comrpessor with said crankshaft when engine speeds are in a relatively low engine speed range, less than a predetermined engine speed, and causing said clutch means to disengage said comprdssor from said crankshaft when the engine speeds are in a relatively high engine speed range, over the predetermined engine speed.

8. An intake system for an internal combustion engine with a supercharger as defined in claim 6, wherein said supercharging means further comprises relief passage means for allowing a portion o said intake passage means, on a downstream side of said comprssor, to communicate with a portion of said intake passage means on an upstream side of said compressor, and relief valve means for controlling a cross-sectional area of said relief passwage means, said relief valve means being controlled so as to vary the supercharging pressure on the basis of engine speeds.

9. An intake system for an internal combustion engine with a supercharger as defined in claim 1, wherein said second intake passage includes a common intake passage provided with said compressor and two branch intake passages divided from a downstream portion of said common intake passage, one of said branch intake passages communicating with at least one of said first intake passages, the other of said branch intake passages communicating with another of the first intake passages, said second control means including a communicating passage portion communicating with each of the branch intake passages and valve means for permitting one of said branch intake passages to communicate with the other of said branch intake passages.

10. An intake system for an internal combustion engine with a supercharger as defined in claim 1, wherein said second control means is arranged to change a length of a resonance air column.

11. An intake system for an internal combustion engine with a supercharger as defined in claim 1, wherien said second control means comprises means for changing a valve closing timing of an intake valve disposed in one of said cylinders.

12. An intake system for an internal combustion engine with a supercharger as defined in claim 1, wherein said first control means includes a first actuator which is adapted to operate in accordance with an electrical signal so as to vary the pressure of the intake air provided by said supercharger, said second control means includes a second actuator which is adapted to operate in accordance with an electrical signal so as to vary the kinetic supercharging effect of intake air, and said synchronizing means includes controller means for outputting said electrical signals to said first and second actuators simultaneously.

13. An intake system for an internal combustion engine with a supercharger as defined in claim 12, wherien said first and second actuators are adapted to operate in accordance with a single signal inputted from said control means.

14. An intake system for an internal combustion engine with a supercharger, comprising:
intake passage means for introducing intake air into each of a plurality of cylinders of said engine, said passage means having first intake passages each of which is individually connected with one of said cylinders, and a second intake passage which is in communication with said first intake passages;

supecharging means having a compressor which is disposed in said second intake passage for supercharging the intake air, said supercharging means providing a kinetic supercharging effect to the intake air in said intake passage means;

first control means for varying supercharging pressure according to operating conditions of said engine; and second control means for varying said kinetic supercharging effect so that volumetric efficiency is changed in accordance with the operating conditions of said engine;

wherein said first control means controls the maximum permissible supercharging pressure of intake air so that when engine speeds are in a relatively high engine speed range, over a predetermined engine speed, the maximum permissible supercharging pressure is set to a lower pressure than the maximum permissible supercharging pressure which is set when the engine speeds are in a relatively low engine speed range, less than the predetermined engine speed, said second intake passage includes a common intake passage provided with said compressor and two branch intake passages divided from a downstream portion of said common intake passage, one of said branch intake passages communicating with at least one of said first intake passages, the other of said branch intake passages communicating with another of the first intake passages, said second control means including a communicating passage portion communicating with each of the branch intake passages and valve means for permitting one of said branch intake passages to communicate with the other of said branch intake passages, and said valve means bringing one of said branch intake passages into communication with the other thereof when the engine speeds are in the relatively high engine speed range and closing off communication between the one of said branch intake passages and the other thereof when the engine speeds are in the relatively low engine speed range.

* * * * *